Patented July 26, 1949

2,476,968

UNITED STATES PATENT OFFICE 2,476,968

PRODUCTION AND TREATMENT OF POLYMERIC MATERIALS

James Wotherspoon Fisher and Edward William Wheatley, Spondon, near Derby, England, assignors to Celanese Corporation of America, a corporation of Delaware No Drawing. Application May 25, 1946, Serial No. 672,332. In Great Britain July 2, 1945

3 Claims. (Cl. 18—54)

This invention relates to improvements in the production and treatment of polymeric materials, and is more particularly concerned with processes for the production of polymers and processes for the production therefrom of shaped articles, such as filaments, films, bristles, ribbons and the like. U. S. application S. No. 609,031 describes the production of nitrogen-containing polymers from dihydrazides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. application S. No. 662,628 describes the production of such polymers from hydrazine and the dicarboxylic acids themselves or their anhydrides, again using more than two moles of hydrazine. Further, U. S. application S. No. 662,628 describes the production of nitrogen-containing polymers from mixtures of diamides and dihydrazides of dicarboxylic acids with free hydrazine, with dicarboxylic acids, esters or anhydrides with ammonia and hydrazine using more than two moles of total base including more than one mole of hydrazine from dinitriles of dicarboxylic acids with hydrazine, and from various other combinations of raw materials. Polymers may be produced according to the processes of the said applications which possess characteristics, including resistance to degenerative hydrolysis by boiling hydrochloric acid, indicating that they contain the 1:2:4-triazole nucleus repeated along the main polymer chain. These polymers will be referred to in the present specification as poly-1:2:4-triazoles. Polymers of high melting point and high nitrogen content approximating to the theoretical nitrogen content for a polymer containing the 4-amino-1:2:4-triazole nucleus repeated at intervals along the polymer chain and linked together by the links derived from the dicarboxylic acid or derivative used as starting material, will be referred to as poly-4-amino-1:2:4-triazoles. Further, the specifications indicate that the polymers so produced, if of sufficiently high molecular weight, may be formed into films or spun into filaments. The said specifications indicate that these new polymers, unlike the known nitrogen-containing polymers which are polyamides, are extraordinarily resistant to hydrolysis. Indeed it is possible to boil them with dilute or concentrated hydrochloric acid without any break-down of the polymer.

We have further found that the polymers are likewise extraordinarily resistant to the hydrolysing action of steam or water even under pressure. In this respect too they are quite unlike the known polyamides, cf. U. S. Specifications Nos. 2,343,174, 2,348,751 and 2,364,387. The following example illustrates this resistance to the hydrolysing action of steam or water.

Example 1

200 grams of an aminotriazole polymers formed from sebacic dihydrazide and having an intrinsic viscosity of 0.50 and a melting point of about 245° C. were enclosed in an autoclave of 375 cc. capacity together with 20 grams of water. The temperature was raised to 260° C. and was maintained at that value for 2 hours. On cooling the polymer was found to be unchanged in melting point and viscosity.

Thus when the conditions are such that water cannot evaporate from the heated polymer, that is to say the vapour space above the polymer contains saturated steam, no further polymerisation can take place. Moreover, the presence of the water prevents resinification setting in, which is possibly the result of cross-linking between terminal carboxylic groups or their equivalent and the exocyclic amino group of the 4-amino-1.2.4-triazole nucleus. When the polymers are heated in steam which is not saturated, we have found that further polymerisation can take place. However, after polymerisation has proceeded to a certain degree, the presence of water vapour which is not saturated serves to slow down the rate of polymerisation. These observations form the basis of the present invention and we utilize the phenomena in two ways. In the first place, by creating conditions towards the end of the polymerisation such that water can evaporate only slowly from the polymer, we are enabled to control the final degree of polymerisation very easily. In particular, by adjusting the pressure above the polymer due to water to a value of, say, at least two-fifths of the pressure of saturated steam at the temperature used for polymerisation, we so slow up the rate of polymerisation that the polymerisation can readily be stopped at any desired value. The total pressure above the polymer may, of course, be due not only to water vapour but to hydrazine and to decomposition products of hydrazine. Generally we find that by adjusting the total pressure towards the end of the polymerisation to a value of at least half the pressure of saturated steam at the polymerisation temperature, we obtain the desired control over the rate of polymerisation. In the second place, by arranging an atmosphere of saturated steam above the polymers during a spinning operation, we are enabled to spin them without any previous viscosity stabilisation whilst avoiding any substantial change in the viscosity of the polymer during spinning. This is very important, since any change necessarily reflects itself not only in the quality of the product but also in the facility with which the spinning is carried out.

The invention will be more particularly described in relation to the polymers obtained from dicarboxylic acid dihydrazides or from equivalent materials, such as hydrazine together with dicarboxylic acid esters or hydrazine together with dicarboxylic acids or the salts formed from the dicarboxylic acids and hydrazine, all these raw materials being referred to in the specifications mentioned, namely U. S. application S. No. 662,628 corresponding to British application No. 11734/45 filed May 10, 1945, and U. S. application S. No. 609,031. All these reactions involve the elimination of water. It would, of course, be quite possible to adjust the conditions so that the water eliminated during the condensation provided all the water that was necessary to saturate or partially saturate the vapour space above the polymer at the end of the polymerisation, i. e. at the point when the polymerisation had proceeded to the desired degree. For example, in the case of forming a polymer from sebacic dihydrazide, the amount of water formed during the condensation in achieving a molecular weight of polymer of the order of 10,000–20,000 is enough to saturate the vapour space above the polymer at a temperature of 260° C. if the polymer-forming reagents originally filled about 60% of the space in the polymerisation vessel.

This, however, is not the preferred method of operating according to the present invention. As in the prior specifications referred to, so in carrying out the process of the present invention, we prefer to carry out the initial stages of the polymerisation in the presence of added water and subsequently to adjust the total amount of water in the reaction chamber so that at the end of the polymerisation the amount of water present is at least sufficient to give a vapour pressure equal to two-fifths of that necessary to saturate the vapour space above the polymer and to give a total pressure above the polymer equal to at least half the pressure of saturated steam at the polymerisation temperature. This may be achieved by suitable pressure release during and towards the end of the polymerisation. Alternatively the preliminary stages of the polymerisation, for example up to an intrinsic viscosity of 0.3, 0.4 or 0.5, may be carried out exactly as described in the prior specifications, and the whole of the pressure, if any, may then be released and the required amount of water, without any hydrazine, then added to the polymer; the vessel closed up once again, and the polymerisation allowed to proceed to the desired point.

The following example illustrates this aspect of the invention.

*Example 2*

Into an autoclave of 6000 cc. capacity, 1000 grams of sebacic dihydrazide and 300 ccs. of 50% hydrazine hydrate were introduced. The autoclave was closed and heated for 2 hours at 220° C. and then for 1 hour at 260° C. The pressure, which had attained a value of approximately 1000 lbs. per square inch, was then reduced over 1 hour to 450 lbs. per square inch and maintained at that value for a further half hour, the temperature throughout these operations being 260° C. The resulting polymer was found to have an intrinsic viscosity of 0.45–0.50, measured in metacresol. This release of pressure to the value given forms a ready means of predetermining the final intrinsic viscosity of the polymer.

A second and equally important aspect of the present invention is in the spinning of the polymers at high temperature. With a polymer as produced according to the prior specifications, without applying any special means for viscosity stabilisation, the heating of the polymer to the temperature of spinning is liable to bring about further condensation with resultant increase in the degree of polymerisation, and hence an alteration of the properties of the polymer, and notably its viscosity. This is undesirable in practice, and according to the present invention this is obviated by carrying out the spinning, for example melt spinning of the polymer, below an atmosphere saturated with water vapour. In this case it is not necessary to maintain a close control over the amount of water present in the spinning pot. As already stated, the polymers used are such that they are not hydrolysed by steam or water, so that there is no disadvantage attendant upon having quite a considerable amount of water in the liquid state in the spinning pot. By having the vapour space above the polymer in the spinning pot saturated with water or other by-product, further polymerisation is obviated and the viscosity of the melted product is maintained at a steady value. If desired, the pressure of the saturated water vapour above the polymer may be the main means of forcing the hot polymer to the spinning jets. The arrangement of the filter pack will then have to be adjusted so that the pressure necessary is equal to that of saturated steam at the spinning temperature. Generally it is desirable to have a much higher pressure than this, which may be provided by an inert atmosphere present in addition to the steam. In speaking of using a pressure of steam, with or without an inert atmosphere, as the means of forwarding the hot polymer to the spinning jets, it will be understood that we prefer to provide a metering pump between the main pool of hot polymer and the spinning orifices for the purpose of forwarding the hot polymer to the spinning jets at an accurately regulated rate. Such a pump is preferably operated so that the pressure on the inlet side and the outlet side is substantially the same. In addition to water in the spinning pot, we may have a small amount of hydrazine.

The following example illustrates this aspect of the invention.

*Example 3*

20 grams of a polyaminotriazole made from sebacic dihydrazide and having an intrinsic viscosity of 0.51 and a melting point of about 246° C. were heated together with 10 ccs. of 50% hydrazine hydrate in a sealed spinning pot of 75 ccs. internal capacity. The pot was fitted with a single hole conical jet of 0.25 mm. internal diameter, a distribution plate of stainless steel and a 200 mesh phosphor bronze filter. Pressure was maintained in the pot by means of a wheel valve fitting over the jet aperture from the outside, the wheel valve being removable if required. The temperature was raised to 260° C. and so maintained for 2 hours, the pressure being of the order of 700 lbs. per square inch. The temperature was then further raised to 285° and a pressure of nitrogen of 900 lbs. per square inch opened on to the top of the pot and the bottom valve removed. Continuous extrusion then took place.

Having described our invention, what we desire to secure by Letters Patent is:

1. In the melt-spinning of poly-1:2:4-triazoles, maintaining an atmosphere of saturated steam above the molten polymer being spun.

2. In the melt-spinning of poly-4-amino-1:2:4-triazoles, maintaining an atmosphere of saturated steam above the molten polymer being spun.

3. In the melt-spinning of poly-octamethylene-4-amino-1.2.4-triazole, maintaining an atmosphere of saturated steam above the molten polymer being spun.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
| --- | --- | --- |
| 2,130,948 | Carothers | Sept. 20, 1938 |
| 2,157,117 | Mites | May 9, 1939 |
| 2,303,340 | Dreyfus | Dec. 1, 1942 |
| 2,395,642 | Prichard | Feb. 26, 1946 |